United States Patent Office 3,409,649
Patented Nov. 5, 1968

3,409,649
OLEFIN OXIDATION PROCESS
Kestutis A. Keblys, Southfield, and Michael Dubeck, Birmingham, Mich., assignors to Ethyl Corporation, New York, N.Y., a corporation of Virginia
No Drawing. Filed Dec. 14, 1964, Ser. No. 418,274
10 Claims. (Cl. 260—413)

ABSTRACT OF THE DISCLOSURE

A process for catalytic oxidation of an olefin which comprises cleaving the olefin at the carbon-to-carbon double bond using a catalyst system consisting essentially of (1) ruthenium or a ruthenium compound (2) alkali or alkaline earth metal salt of an oxyhalide acid and (3) an alkali, said process being carried out in a basic aqueous medium. Olefins having up to 100 carbon atoms are useful. Sodium or calcium hypochlorite are examples of suitable salts while sodium hydroxide and calcium hydroxide are examples of useful alkalis. The products obtained in this process are carboxylic acids, ketones and keto acids.

---

This invention relates to a novel process of *catalytic oxidation* of olefins. More specifically, it relates to a process employing a novel catalytic system comprising ruthenium metal, organic ruthenium compounds, or inorganic ruthenium compounds.

An object of this invention is to provide a process for the oxidation of olefins to useful products. A particular object is to provide a catalytic process by which olefins can be oxidized to carboxylic acids or ketones, and mixtures thereof.

The objects of this invention are accomplished by providing a process which comprises cleaving the olefin at a point of unsaturation with a catalytic system consisting essentially of (a) a ruthenium-containing material, (b) a metal salt of an oxyhalide acid, said metal being selected from the group consisting of the alkali metals and the alkaline earth metals, and (c) an alkali; said process being carried out in the presence of a basic aqueous medium.

A preferred embodiment of this invention comprises a process for the catalytic oxidation of olefins, said process comprising cleaving an olefin having from 3 to about 40 carbon atoms at a point of unsaturation in said olefin, with a catalytic system consisting essentially of (a) a ruthenium-containing material selected from the group consisting of ruthenium metal, organic ruthenium compounds, and inorganic ruthenium compounds, (b) an oxidizing agent of a metal salt selected from the group consisting of the alkali and alkaline earth metal salts of the hypohalous acids and halous acids, and (c) an alkali selected from the group consisting of sodium hydroxide and calcium hydroxide mixed with an aqueous medium.

Outstanding features of this process are its decided economic advantages and its simplicity. The reactants are comparatively inexpensive and readily obtainable. Furthermore, the catalysts are stable and relatively non-toxic. Hence, they may be stored and used without elaborate safety precautions. Moreover, the process may be carried out in standard reaction vessels.

An important aspect of this invention is that it requires considerably less than a molar equivalent quantity of the catalyst. Moreover, the used catalyst may be reactivated and reused. Furthermore, the process may be carried out in a continuous flow operation. The process of this invention will produce highly desirable carboxylic acids and ketones, depending on the starting olefin.

The process is carried out in the presence of an aqueous reaction medium. The amount of water used is not critical, but generally it is found to be in the range of from 1 to about 15 times the volume of olefin employed. It is not necessary, however, that the process be carried out in water alone since a co-solvent may be advantageously employed. Especiallly desirable co-solvents are those which will dissolve the olefinic starting material and thus, enable a better contact between the olefin and the catalytic system. Such co-solvents, however, must be inert solvents not susceptible to oxidation. In general, paraffinic hydrocarbons and halogenated hydrocarbons may be used. Preferred are chlorinated lower members of the paraffin seies having a boiling range of from about 50° to 200° C. as, for example, chloroform and carbon tetrachloride.

Although agitation is not absolutely necessary in this process, often it may be very advantageously employed, especially since the olefins per se, or solutions of an olefin in an organic solvent may not be readily miscible with the aqueous alkali employed in the process. Thus, efficient agitation usually tends to decrease the reaction time and often may even decrease the temperature at which the reaction must be carried out.

The process of this invention is generally carried out under atmospheric pressure. However, when olefins having up to 6 carbon atoms are employed, it is preferable to carry out the reaction under pressure. Any pressure above atmospheric may be used, but pressures within the range of from about 50 p.s.i.g. to about 500 p.s.i.g. are convenient and lead to satisfactory results.

The process may be carried out at any temperature which affords a reasonable reaction time and which does not cause excessive decomposition of the catalyst system. In many instances the best results are obtained when the reaction is carried out within the temperature range of from about −10° C. to about 100° C. The most preferred temperature range for the process of this invention is from about 0° to about 60° C.

The reaction time is not a truly independent variable and is dependent primarily on the amount of the olefin used as well as on the temperature of the reaction and the type and chain length of the olefin that is to be oxidized. Generally speaking, α-olefins are the least reactive for the purpose of this invention and, thus, tend to require the longest reaction time. Internal olefins, vinylidenes, branched internal and cyclic olefins and diolefins are more reactive than the α-olefins and consequently require less time to complete the reaction. Furthermore, olefins of a particular type having less than about 8 carbon atoms generally need less time for the oxidation than those having more than 8 carbon atoms.

The catalytic system employed in this process consists essentially of (a) a ruthenium-containing material, (b) an oxidizing agent which is a metal salt of an oxyhalide acid, and (c) an alkali. The ruthenium-containing material can be a ruthenium metal or organic and inorganic ruthenium compounds. Any organic and inorganic ruthenium salt having an anion which does not unduly retard the formation of the desired products by an extraneous side reaction is a suitable catalyst. Applicable catalytic salts include organic and inorganic salts. Salts of fatty acids having up to four carbon atoms are preferred organic salts. Highly preferred salts of this type are ruthenium formate, ruthenium acetate, ruthenium propionate, and ruthenium butyrate.

Inorganic salts in general and simple inorganic salts in particular constitute a highly preferred class of ruthenium-containing materials. Salts of this type are readily available and comparatively inexpensive. Illustrative but non-limiting examples of simple inorganic salts which can be employed are ruthenium trichloride, ruthenium tribromide, ruthenium sulfide, ruthenium carbonate, and the like. Ruthenium dioxide is also a highly preferred ruthenium-containing material. In addition to the above, organometallic compounds such as bis(cyclopentadienyl) ruthenium and ruthenium carbonyls such as $Ru(CO)_5$, $Ru_2(CO)_9$, $[Ru(CO)_4]_3$, and $Ru(CO)X$ (X=chlorine, bromine or iodine) may also be employed in the catalytic system. A wide variety of ruthenium chelates are applicable in the instant process. Preferred chelates have a donor atom selected from the class consisting of Group V–B and Group VI–B elements of the Periodic Table as shown by Moeller, Inorganic Chemistry, John Wiley and Sons, Inc., New York (1952), page 122. More preferred chelating agents have a donor atom selected from the class consisting of nitrogen and oxygen. Triamines, tetraamines, and oximes comprise a preferred class of chelating agents having nitrogen as a donor atom. Dibasic carboxylic acids comprise a preferred class of chelating agents having oxygen as a donor atom. Thus, chelates derived from well-know chelating agents such as salicylic acid, α-acyloin oxime, α-benzoin oxime, dimethylglyoxime, acetylacetone, aminoacetic acid, oxalic acid, diethylenetriamine, triethylenetetraamine, malonic acid, and the like can be employed. Illustrative but non-limiting examples of applicable chelates include $Na_3[Ru(C_2O_4)_3] \cdot 6H_2O$, $K_3[Ru(malonate)_3] \cdot 5H_2O$, tris(ethylenediamine) ruthenium$^{III}$, and the like.

Of the above-listed ruthenium-containing materials, ruthenium metal, ruthenium trichloride, and ruthenium dioxide are the most highly preferred. When ruthenium metal or ruthenium dioxide or other ruthenium compounds that are not soluble in water are employed in the catalytic system, it is prefered that the ruthenium-containing material be in a fine state of subdivision. Metal turnings and finely divided powders can be employed. Colloidal dispersions of the material in a liquid medium are also applicable.

An important and necessary part of the catalytic system of this process is an oxidizing agent which is a metal salt of an oxyhalide acid, said metal being selected from the group consisting of the alkali metals and the alkaline earth metals. Although any oxyhalide acid may be employed, hypohalous acids and halous acids are preferred. For economic reasons, the most preferred metals to be used in conjunction with oxyhalide acids are sodium and calcium. Thus, the most preferred metal salts of oxyhalide acids are sodium hypochlorite, sodium chlorite, calcium hypochlorite, and calcium chloride. The above-mentioned oxidizing agents may be generated electrolytically or generated in situ by passing, for example, chlorine gas through an excess of aqueous alkali.

Another necessary component of the catalytic system is an alkali. Although any alkali such as lithium hydroxide, sodium hydroxide, potassium hydroxide, rubidium hydroxide, or cesium hydroxide may be employed for economic reasons, sodium hydroxide and calcium hydroxide are preferred.

The reaction of this process is carried out in the presence of a catalytic amount of the ruthenium-containing material which is usually up to about 20 mole percent. Amounts as low as 0.01 mole percent can be employed, but usually the preferred range is between one and 5 mole percent. The oxidizing agent, that is, a metal salt of an oxyhalide acid (such as defined above) should be used in the amount of at least one mole per mole of olefin. Although much larger amounts may be employed, a large excess of the oxidizing agent is undesirable because it tends to promote side reactions. The preferred amount of metal salt of an oxyhalide acid is from about 1 to about 5 moles per mole of the olefin. It is important that the aqueous reaction medium in which the reaction is carried out be alkaline, and most preferably, have a pH of at least 11. A pH considerably higher than 11 is undesirable since under such conditions, the production of lower carboxylic acid is favored.

When the process of this invention is utilized to prepare carboxylic acids, it is preferable to have less than 100% conversion of the olefins to the acids; a conversion in the range of from about 30% to about 80% is preferred. The reason for keeping the conversion below 100% is to prevent the possibility of side reactions which carboxylic acids tend to undergo. This preferred procedure does not affect the economics of the process because the unreacted olefin may be easily recovered either by extraction or by removing the aqueous layer containing the acid salt and returning the organic layer back to the reaction vessel.

The ruthenium-containing material, which is the main ingredient in the catalytic system of this process, may be recovered and reused in subsequent oxidation reactions. If, at the end of the reaction, the catalyst is in the form of a solid, it may be filtered and directly reused. If, on the other hand, it is found in solution in the aqueous layer, it may be precipitated with sulfides (such as sodium sulfide or hydrogen sulfide) or by an ion exchange method, and likewise reused in the process of this invention.

When, in carrying out the process of this invention, a procedure is used wherein the olefin is charged to the flask and the oxidizing agent and ruthenium-containing material are mixed and then added to the reaction flask (e.g., Example I) it has been observed that the decomposition of the oxidizing agent takes place on standing. For this reason, the procedure exemplified in Example 2 is preferred. In that procedure both the olefin and the ruthenium-containing material are charged to the reaction flask and the oxidizing agent is added at a desired rate thereto. In this manner, the untoward decomposition of the oxidizing agent is minimized.

The process of this invention may be employed to oxidize a wide variety of olefins yielding desirable products such as acids and ketones. Thus, any olefin which is stable under reaction conditions, and does not contain substituent groups which hinder or retard the process of this invention by undergoing competitive side reactions, may be employed in this process. Olefins that may be used are, for example, α-olefins, internal olefins, vinylidenes, internal (trisubstituted) olefins, internal (tetrasubstituted) olefins, dienes, and cyclic olefins. Olefins having up to about 40 carbon atoms are preferred since, in general, they are more readily available. However, it is clear that no exact critical limitation of the number of carbon atoms exists. Consequently, olefins having more than 40 carbon atoms, say 50 or more, many be employed in this process.

Some of the non-limiting examples of olefins that may be used in the process of this invention are set forth below. Examples of α-olefins are propylene, hexene-1, isobutylene, 4-methyl hexene-1, decene-1, 1,5-hexenediene, 6-propyl decene-1, dodecene-1, dodecane triene-1,4,8, 2-butyl-1-octene, pentadecene-1, hexadecene-1, eicosene, and the like. The oxidation of α-olefins can be illustrated by the following equation wherein the α-olefin is α-tetradecene and [Ru] is a ruthenium-containing material.

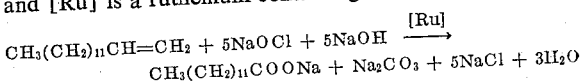

Internal olefins having the general formula:

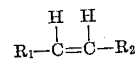

wherein $R_1$ and $R_2$ are univalent organic radicals independently selected from the group consisting of alkyl, aryl, and cycloalkyl radicals, such that the total number of carbon atoms does not exceed about 40, may be oxidized by the process of this invention to give a salt of a monocarboxylic acid or a mixture of two different monocarboxylic acid salts, depending on the location of the double bond. Non-limiting examples of internal olefins are: 3-heptene, β-tetradecene, 10-eicosene, and the like. The reaction of internal olefins is exemplified by the following equation.

$$CH_3(CH_2)_4CH=CH(CH_2)_5CH_3 + 4NaOCl + 2NaOH \xrightarrow{[Ru]}$$
$$CH_3(CH_2)_4COONa + CH_3(CH_2)_5COONa + 4NaCl + 2H_2O$$

Vinylidenes having the general formula:

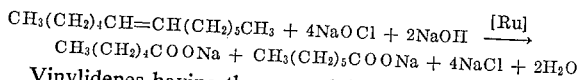

wherein $R_1$ and $R_2$ are univalent organic radicals independently selected from the group consisting of alkyl, aryl, and cycloalkyl radicals, such that the total number of carbon atoms does not exceed about 40, may be reacted to yield a ketone. Non-limiting examples of vinylidenes are: 2-butyl-1-octene, 2-decyl-1-dodecene, 2-dodecene-1-tetradecene, 2-ethyl-1-butene, and the like. The reaction of vinylidene compounds is exemplified by the following equation:

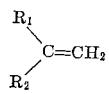$C=CH_2 + 4NaOCl + 2NaOH \xrightarrow{[Ru]}$ $$CH_3(CH_2)_3\overset{O}{\underset{\|}{C}}(CH_2)_5CH_3 + Na_2CO_3 + 4NaCl + 2H_2O$$

Branched internal (trisubstituted) olefins having the general formula:

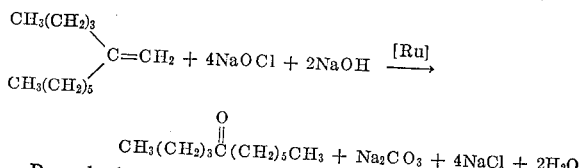

wherein $R_1$, $R_2$ and $R_3$ are univalent organic radicals independently selected from the group consisting of alkyl, aryl, and cycloalkyl radicals, such that the total number of carbon atoms does not exceed about 40, may be oxidized to produce a mixture of a ketone and a salt of a monocarboxylic acid. Non-limiting examples of internal (trisubstituted) olefins are: 6-ethyl-6-tridecene, 5-pentyl-5-decene, 9-decene-9-eicosene, and the like. The reaction of internal (trisubstituted) olefins is exemplified by the following equation:

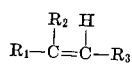

$$CH_3-(CH_2)_4-\underset{\underset{CH_2CH_3}{|}}{C}=\underset{\underset{(CH_2)_5CH_3}{|}}{C}^H + 3NaOCl + NaOH \xrightarrow{[Ru]}$$

$$CH_3(CH_2)_4\overset{O}{\underset{\|}{C}}CH_2CH_3 + CH_3(CH_2)_5COONa + 3NaCl + H_2O$$

Branched internal (tetrasubstituted) olefins having the general formula:

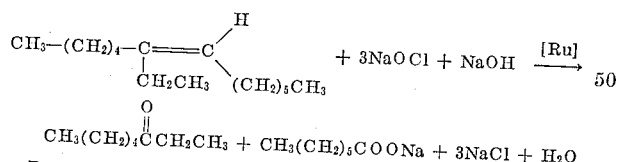

wherein $R_1$, $R_2$, $R_3$, and $R_4$ are univalent organic radicals independently selected from the group consisting of alkyl, aryl, and cycloalkyl radicals, such that the total number of carbon atoms does not exceed about 40, when oxidized by the process of this invention yield a ketone or a mixture of two ketones, depending on the structure of the starting material. Non-limiting examples of internal (tetrasubstituted) olefins are: 7,8-diethyl-7-pentadecene, 10,11-dioctyl-10-eicosene, and the like. The reaction of internal (tetrasubstituted) olefins is exemplified by the following equation:

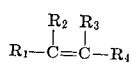

$$CH_3(CH_2)_5\underset{\underset{C_2H_5}{|}}{C}=C-(CH_2)_6CH_3 + 2NaOCl \xrightarrow[\text{[NaOH]}]{[Ru]}$$

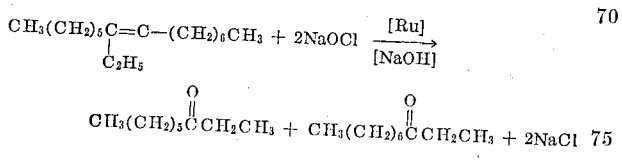

Dienes having the general formula:

$$R_1-CH=CH-(CH_2)_n-CH=CH-R_2$$

wherein $R_1$, and $R_2$ are univalent organic radicals independently selected from the group consisting of alkyl, aryl and cycloalkyl radicals, such that the total number of carbon atoms does not exceed about 40, may be oxidized to yield a mixture of a monocarboxylic acid salt and a dicarboxylic acid salt. Non-limiting examples of dienes are: 2,8-decadiene, 4,12-hexadecadiene, 5,10-eicosadiene, and the like. The reaction of dienes is exemplified by the following equation:

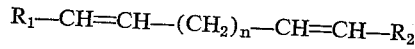

$$2CH_3COONa + NaOOC(CH_2)_4COONa + 8NaCl + 4H_2O$$

Cyclic olefins such as cyclopentene, cyclohexane, cyclooctene, and the like may likewise be oxidized by the process of this invention. When cyclic olefin is reacted, a dicarboxylic acid salt is produced; but when an alkyl-substituted cyclic olefin (the substitution being on the carbon atom adjacent to the double bond) is reacted, a monocarboxylic keto acid salt will result. The reactions of cyclic olefins are exemplified by the following equations.

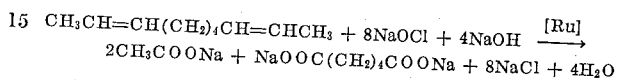

$$NaOOC(CH_2)_6COONa + 4NaCl + 2H_2O$$

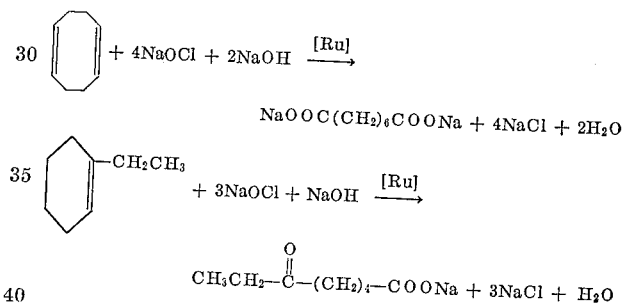

$$CH_3CH_2-\overset{O}{\underset{\|}{C}}-(CH_2)_4-COONa + 3NaCl + H_2O$$

It is evident from the above discussion that the process of this invention is quite versatile and may be used for the preparation of a wide variety of acids and ketones and mixtures thereof by selecting particular olefins as starting materials. This process may be employed to prepare a predetermined mixture of acids of varying chain lengths and/or a mixture of mono and dicarboxylic acids merely by having a particular mixture of olefins as starting material.

The following examples further illustrate the process of this invention but do not limit it. All parts are by weight unless otherwise indicated.

Example 1.—Oxidation of 1-hexene with ruthenium trichloride-sodium hypochlorite

To 600 parts of 1.81 molar sodium hypochlorite solution containing 18.8 parts of sodium hydroxide was added 2.12 parts of ruthenium trichloride. A flask equipped with a high-speed stirrer, a condenser, a thermometer, and an addition funnel was charged with 33.7 parts of 1-hexene. The above sodium hypochlorite-ruthenium trichloride solution was added to the reaction flask from the addition funnel in 5 to 10 part increments. The reaction mixture was stirred at high speed while the temperature was maintained at 16–22° C. by cooling with a water bath.

After all of the sodium hypochlorite-ruthenium trichloride solution had been added, the reaction mixture was stirred for one hour at 17–20° C. After the addition of 17 parts of hexene-1, the layers were separate and filtered to remove the gray solid. The glassware and the solid were washed with heptane and the washings were combined with the organic layer. The analysis of the organic layer by vapor phase chromatography showed that 51 percent of unreacted 1-hexene was recovered. Thus, only 49 percent of hexene had reacted.

The aqueous layer was treated with 20 parts of concentrated sodium sulfite solution, producing a black precipitate which was filtered off. A sodium hydroxide solution was added to the filtrate until the pH of 11 was obtained. It was then saturated with sodium chloride and extracted with four 70-part portions of ether which were discarded. The aqueous portion was acidified to a pH of one with hydrochloric acid, saturated with sodium chloride, and likewise extracted with four 70-part portions of ether. This ether extract was dried over magnesium sulfate and concentrated to about one-tenth of its original volume. Vapor phase chromatography showed that the product was butyric acid, 9.9 percent yield, and valeric acid, 26 percent yield. The above yields are based on reacted olefin.

Example 2.—Oxidation of 1-hexene with ruthenium dioxide-sodium hypochlorite

A flask equipped as in Example 1 was charged with 33.7 parts of 1-hexene and 1.9 parts of ruthenium dioxide. To this mixture was added, in 1 to 10-part increments, 650 parts of 1.82 molar sodium hypochlorite solution containing 19.2 parts of sodium hydroxide. The reaction was carried out at 16–22° C. as described in the preceding example.

At the end of the reaction the mixture was filtered to remove the black solid and the solid was washed with heptane and water. The heptane layer was analyzed by vapor phase chromatography and indicated that 30% of unreacted hexene was recovered. The reacted mixture was treated as in Example 1. The product, containing valeric acid in 46% yields, based on reacted 1-hexene, was obtained.

Example 3.—Oxidation of 1-hexene with ruthenium metal-sodium hypochlorite

To 775 parts of 1.55 molar sodium hypochlorite solution containing 18.4 parts of sodium hydroxide (pH 11.7) was added 0.5 part of ruthenium metal. The resulting solution was cooled to −2° C. and stirred. Eighteen parts of 1-hexene dissolved in 17 parts of n-heptane was then added over a period of four hours. The ice bath was removed and the reaction mixture allowed to warm to room temperature. After four hours at a temperature of 20–30° C., the reaction mixture was filtered and the solid washed with n-heptane. The filtrate was separated into two layers, and vapor phase chromatography of the organic layer disclosed that 13% of n-hexene was recovered.

The aqueous layer was extracted with two 35-part portions of n-heptane and then with four 70-part portions of ether. Both extracts were discarded. After acidification of the aqueous layer with concentrated hydrochloric acid, the solution was saturated with sodium chloride and extracted with four 70-part portions of ether. The examination of this ether extract by vapor phase chromatography showed that $C_2$–$C_5$ acids were present in the following yields: acetic acid, 2 percent; butyric acid, 7.3 percent; propionic acid, 2.3 percent; and valeric acid, 51 percent. The yields are based on the reacted olefin.

Example 4.—Oxidation of 3-heptene

To a flask equipped as in Example 2 was added 41.7 parts of 3-heptene and 2.07 parts of ruthenium trichloride. The mixture was stirred and 600 parts of 1.76 molar sodium hypochloride solution containing 22.4 parts of sodium hydroxide was added while the temperature was maintained at 15–22° C. The addition required seven hours.

Thirty-five parts of ether was then added and the layers separated and filtered. The ether layer was analyzed by vapor phase chromatography and showed that 55 percent of the olefin reacted. The dark orange aqueous layer was treated with 15 parts of saturated sodium sulfite to decompose any remaining hypochlorite. The resulting black precipitate was filtered off and the filtrate was saturated with sodium chloride and extracted with 70 parts of ether. The filtrate was then acidified with concentrated hydrochloric acid to a pH of one and again extracted with 70 parts of ether to give the acid extract containing the product composed of propionic and butyric acids, 61 percent yield, and acetic and valeric acids, 9.5 percent yield.

Example 5.—Oxidation of 2-butyl-1-octene

The reaction was carried out as described in the preceding example using 27.1 parts of 2-butyl-1-octene, 1.65 parts of ruthenium trichloride, and 475 parts of 1.40 molar solution of sodium hypochlorite containing 13 parts of sodium hydroxide. The addition of hypochlorite required about seven hours during which time the temperature was maintained at 17–22° C. The reaction mixture was then stirred for three hours at 24–29° C. Fifty-five parts of ether was then added and the layers were separated. The dark brown ether layer was filtered and dried over magnesium sulfate. The aqueous layer was processed according to the procedure of Example 1, yielding an acid extract which contained small amounts of $C_2$–$C_7$ carboxylic acids. The dark brown ether layer, after removal of solvent, was distilled in vacuo giving an 83% yield of 5-undecanone.

Example 6—Oxidation of 1-dodecene

A flask equipped as in Example 2 was charged with 44.19 parts of 1-dodecene and 2.0 parts of ruthenium trichloride. Six hundred parts of 1.66 molar sodium hypochlorite solution containing 17.2 parts of sodium hydroxide was added over a seven-hour period to the reaction flask from the dropping funnel. The reaction temperature was maintained at 20–30° C. for the first 24 hours and then increased to 30–40° C. for the final four hours. The reaction product was then filtered giving a black solid. The solid and the aqueous filtrate was washed with three 35-part portions of n-heptane. The washings were combined and submitted to vapor phase chromatography analysis which showed that 22.4 parts of dodecene was recovered.

The black solid was dispersed in 300 parts of ether, acidified with concentrated hydrochloric acid and filtered. The filtrate was separated into layers and the ether layer washed once with about 100 parts of water before being dried over magnesium sulfate. This solution was distilled to about one-third of its volume and then submitted to vapor phase chromatography analysis which showed that it contained 2.6 parts of dodecene, 0.7 gram $C_{10}$ acid, and 18.1 parts of $C_{11}$ acid. Thus, the combined recovery of 1-dodecene was 25.0 parts or 57 percent, and the yield of decanoic and undecanoic acids, based on consumed olefin, was 4% and 90% respectively.

Example 7.—Oxidation of 1-dodecene using carbon tetrachloride as solvent

A flask equipped as in Example 2 was charged with 9.5 parts of 1-dodecene, 160 parts of carbon tetrachloride, and 0.4 parts of ruthenium trichloride. One hundred twenty parts of 1.68 molar sodium hypochlorite solution containing 35.2 parts of sodium hydroxide was added over a six-hour period to the reaction flask. The reaction temperature was maintained between 20 and 25° C. for the first three hours and then raised to 30–35° C. for an additional four hours. The reaction mass contained a black solid but appeared to be fluid at all times. The lower carbon tetrachloride layer containing the black solid was diluted with 100 parts of ether, acidified, and saturated with sodium chloride. The two layers were separated and the organic layer was dried over magnesium sulfate. vapor phase chromatography analysis indicated that 15% of dodecene was recovered and that the product was $C_{11}$ acid obtained in a 42.7% yield.

The examples listed in the following table further illustrated the process of this invention. In these examples, the general procedure of Example 2 is followed.

| Example No. | Olefin | Catalyst | Oxidizing Agent | Reaction Temp., °C. | Product(s) |
|---|---|---|---|---|---|
| 8 | Cyclohexene | Ruthenium carbonate | Ca(OCl)$_2$ | 20–30 | Adipic acid. |
| 9 | 1,5-hexadiene | Ruthenium metal | NaClO$_2$ | 15–25 | Succinic acid. |
| 10 | 2-tetradecene | Ruthenium sulfide | NaClO | 20–30 | Dodecanoic acid; acetic acid. |
| 11 | 5-pentyl-5-decene | Ruthenium chloride | NaClO | 22–50 | Butyl pentyl ketone; butyric acid. |
| 12 | 7,8-diethyl-7-tetradecene | Ruthenium formate | Ca(ClO$_2$)$_2$ | 20–30 | Hexyl ethyl ketone. |
| 13 | Methyl cyclohexene | Ruthenium bromide | NaClO | –10–5 | 6-oxoheptanoic acid. |
| 14 | 2-ethyl-1-hexene | Ruthenium dioxide | NaClO$_2$ | 20–30 | Butyl ethyl ketone. |
| 15 | 2-dodecene | Ruthenium metal | NaClO$_2$ | 20–30 | Decanoic acid; acetic acid. |
| 16 | 4-hexadecene | Bis(cyclopentadienyl)ruthenium | NaClO | 90–100 | Dodecanoic acid; butyric acid. |
|    |             |                                |       | 10–20 |                              |

The process of this invention produces, in addition to the desired product or products, a mixture of by-products. The product may be separated by simple conventional techniques. When the product is an acid, the reaction mixture, at the end of the reaction, is acidified with a mineral acid such as hydrochloric acid or sulfuric acid and the resulting free acid extracted with an inert solvent such as, for example, hexane. The final separation of the acid product may be accomplished by distillation. When a ketone is produced by the process of this invention, it may be isolated at the end of the reaction by distillation. When a mixture of an acid and a ketone is prepared, the reaction mixture is first distilled to remove the ketone and then the reaction mixture is acidified, extracted and distilled, as described above, to yield the acid portion of the product.

Carboxylic acids produced by the process of this invention are useful as intermediates in the production of detergents, plasticizers, lubricating oils, oil additives, insecticides, as well as monomers for polymeric synthesis. The ketone products are useful as solvents and chemical intermediates.

Having fully described the novel process of this invention and the many utilities of the products produced thereby, we desire to be limited only within the lawful scope of the appended claims.

We claim:

1. A process for the catalytic oxidation of an olefin hydrocarbon having from 3 to 20 carbon atoms, said hydrocarbon being selected from α-olefins, internal olefins, vinylidines, dienes, and cyclic olefins, said process comprising cleaving said olefin at a point of unsaturation with a catalytic system consisting essentially of:
   (a) a ruthenium-containing material selected from ruthenium metal, simple inorganic ruthenium salts, ruthenium salts of fatty acids of up to four carbon atoms, ruthenium dioxide, cyclopentadienyl ruthenium compounds, ruthenium carbonyls, and ruthenium chelates,
   (b) a metal salt of an oxyhalide acid, said metal being selected from the group consisting of the alkali metals and the alkaline earth metals, and
   (c) an alkali;
said process being carried out in the presence of a basic aqueous medium.

2. A process for the catalytic oxidation of an α-olefin hydrocarbon having from 3 to about 20 carbon atoms, said process comprising cleaving said olefin at the point of unsaturation with a catalytic system consisting substantially of:
   (a) a ruthenium-containing material selected from ruthenium metal, simple inorganic ruthenium salts, ruthenium salts of fatty acids of up to four carbon atoms, ruthenium dioxide, cyclopentadienyl ruthenium compounds, ruthenium carbonyls, and ruthenium chelates,
   (b) an oxidizing agent which is a metal salt of an oxyhalide acid, said metal being selected from the group consisting of the alkali metals and the alkaline earth metals, and
   (c) an alkali;

said process comprising the steps of adding said ruthenium-containing material to said α-olefin and thereafter adding an aqueous mixture of said oxidizing agent and said alkali to said α-olefin, said oxidizing salt being added in the amount of at least one mole per mole of said α-olefin, and said alkali being added in such an amount that the pH of the reaction medium is at least 11; and reacting the resultant mixture at a temperature within the range of from about 0° C. to about 60° C.

3. The process of claim 2 wherein the ruthenium-containing material is selected from the group consisting of ruthenium metal, ruthenium trichloride, and ruthenium dioxide.

4. The process of claim 2 wherein the ruthenium-containing material is ruthenium trichloride, the oxidizing agent is sodium hypochlorite, and the alkali is sodium hydroxide.

5. The process of claim 1, wherein said oxyhalide acid is selected from the group consisting of hypohalous acids and halous acids and said metal is selected from sodium and calcium and wherein said alkali is selected from sodium hydroxide and calcium hydroxide.

6. The process of claim 5 wherein the ruthenium containing material is selected from the group consisting of ruthenium metal, ruthenium trichloride and ruthenium dioxide.

7. The process of claim 6 wherein said olefin has from 3 to about 40 carbon atoms.

8. The process of claim 6 wherein said olefin is an internal olefin having from about 5 to about 40 carbon atoms, said olefin being selected from olefins having the formula (a)

(b)

(c)

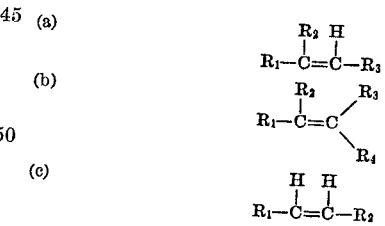

wherein $R_1$, $R_2$, $R_3$ and $R_4$ are alkyl radicals.

9. The process of claim 4 wherein said olefin is dodecene-1.

10. The process of claim 5 wherein said olefin is a diene having from 3 to 20 carbon atoms.

References Cited

UNITED STATES PATENTS 3,021,367  2/1962  Schmerling et al. _____ 260–533
3,154,586  10/1964  Bander et al. _____ 260–533 XR

OTHER REFERENCES

Fieser et al., Organic Chemistry, (1956), pp. 67–68.

NICHOLAS S. RIZZO, *Primary Examiner.*

J. A. NARCAVAGE, *Assistant Examiner.*